July 25, 1967 L. E. HUMPHREY ETAL 3,333,037
PROCESS FOR THE PRODUCTION OF ALKALI METAL COMPOSITE
ELECTRICAL CONDUCTORS
Filed Sept. 7, 1965

INVENTORS
LAURENCE E. HUMPHREY
GILBERT I. ADDIS
RAYMOND C. HESS
BY Robert C. Sullivan
ATTORNEY United States Patent Office 3,333,037
Patented July 25, 1967

3,333,037
PROCESS FOR THE PRODUCTION OF ALKALI
METAL COMPOSITE ELECTRICAL CON-
DUCTORS
Laurence E. Humphrey, Westfield, Gilbert I. Addis, Plain-
field, and Raymond C. Hess, Westfield, N.J., assignors
to Union Carbide Corporation, a corporation of New
York
Filed Sept. 7, 1965, Ser. No. 485,523
22 Claims. (Cl. 264—105)

This application is a continuation-in-part of application Ser. No. 311,059 filed Sept. 24, 1963, now abandoned, which is a continuation-in-part of application Ser. No. 302,942 filed Aug. 19, 1963 both of which are now abandoned.

This invention relates to a novel method for the production of unique composite electrical conductors, and particularly to a continuous process for the production of alkali metal composite electrical conductors in which the insulated conductor can usually be produced from basic materials in a single operation.

Heretofore, a wide variety of insulated electrical conductors of different constructions have been made from a large number of materials. The main conducting element in these conductors has generally been made of copper and aluminum. Accordingly, manufacturing processes and techniques have been directed to and limited by the inherent properties and deficiencies of these materials. These very properties have dictated that insulated composite electrical conductors be made in a large number of separate operations. For example, copper or aluminum ingot is converted to rod which is in turn drawn into wires. Since copper is rigid in large diameters and is subject to age and work hardening it is necessary to form large conductors from bundles of many filaments or fine strands in order that the conductor be flexible. Since these bundles present many interstices or air spaces, cables for use in high voltage application must be completely covered by a semi-conductive "strand shielding." Then the insulation and additional coverings must be applied; each usually requiring a separate step or operation. Metallic sodium, as illustrative of the alkali metals, has been previously investigated as an electrical conductor and is described in detail in Transactions of Electrochemical Society, vol. 62, pages 151, 1932. As noted in the cited article, although the specific resistance of solid sodium is about three times as great as that of copper the specific gravity of sodium is about one-ninth that of copper. Thus for any given conductivity, a sodium conductor weighs only one third as much as an equivalent copper conductor.

The alkali metals are not subject to the many deficiencies of conventional conductor metals but do present several unique problems of their own such as high chemical reactivity. While several composite conductors have been proposed using alkali metals as the conducting element, these conductors have never achieved commercial acceptance because of various technical and economic difficulties.

Since the alkali metals are extremely active elements, especially in respect to moisture and oxygen, and in addition have low tensile strength, they are of no practical use as electrical conductors unless encased in a protective and reinforcing casing. Although a number of different casings have been proposed, none has made the alkali metal conductor a practical success. For example, it has been proposed to encase the alkali metal in a metal tube which makes the resulting conductor heavy and relatively rigid and leads to costly and difficult fabrication because of the problems associated with the production of long and continuous lengths. Encasement metals such as iron or steel are impractical for carrying alternating current because of increased A–C resistance. Metals such as lead are impractical as encasing members because they react with alkali metals at elevated temperatures to produce brittle reaction products.

Such metallic encasements have been proposed in such references as U.S. Patent 833,290 to A. G. Betts, dated Oct. 16, 1906, and French Patent 973,315 issued Feb. 9, 1951, to S. Cantacuzene. In this latter reference mention is made to the use of lead or an unspecified polymeric material as the encasement material which is insulated by an electrical insulation such as oil and paper and then jacketed. However, severe work hardening and alloying problems of lead and sodium make such encasements impractical. More recently the use of oil impregnated paper wrappings as both on insulator and protective element for alkali metal conductors has been proposed by Theodore De Koning in his book "The Cooling of Electrical Machines and Cables" published by the author, Hague, Holland, Second Edition, 1952. Such conductors are inherently fragile. Wrappings tend to tear or slip on bending or elongation or split under compression which leads to subsequent electrical breakdown. Moreover there is little flexibility to the encased or wrapped conductor. The methods proposed for producing these insulated composite alkali metal conductors have for the most part been restricted to the limited techniques applied to copper and aluminum conductors. All of these proposed methods require many separate steps to produce such insulated conductors. Until the present invention, no method has been known by which complete, insulated composite electrical conductors could be produced continuously in unlimited length in a single step or operation. Additionally until this invention no method had been known for producing a flexible relatively large diameter metallic conductor cable which could be used in high voltage applications without the necessity of using semiconductive strand shielding.

Now, in accordance with the present invention we have found that the many deficiencies and problems of the prior art processes are overcome by extruding a tube of molten polymeric thermoplastic which is essentially inert to alkali metals and simultaneously filling the tube with molten alkali metal, wherein at least an annular portion of the thermoplastic tube serves as the electrical insulation for the alkali metal composite conductor. More specifically the present invention is based on the finding that by extruding a molten thermoplastic polymer insulation in the form of a tubing and filling said tubing with molten alkali metal simultaneously with its extrusion, a continuous cable can be produced which is limited in length only by practical considerations. It has been surprisingly found that by contacting the thermoplastic polymer and the alkali metal while both are in a molten state, and in the absence of air the two diverse materials are found to adhere to each other to the extent that when forced apart the separation does not appear to occur at the interface. That further, highly flexible composite electrical conductors having a solid unitary conductor element, as made, do not require stranding of the conductor to achieve flexibility nor semi-conductive strand-shielding to provide high voltage corona protection, although such materials can be used if so desired. It has also been surprisingly found that a wide variety of composite conductors in varying sizes can be produced from a single extrusion die by merely modifying the process conditions. We have additionally found that an insulated composite electrical conductor can be prepared continuously with a large number of annular layers of thermoplastic material and compositions through the utilization of multi-channel multi orifice dies. This permits the continuous production of insulated composite conductors having relatively complex structures in a single step or operation.

It is particularly noteworthy that the process of this invention as well as the composite conductors produced in accordance with this process are unexpectedly free of many hazards normally associated with alkali metals. For example, additional special skills are not required in the production of the composite conductor or in the handling or installation thereof even though the conductor metal is highly chemically reactive. If the polymeric insulation is damaged as by breaking or burning during production or installation to the extent of exposing the alkali metal core, limited action or reaction of the metal with its environment, whether it be air, water and the like, takes place. These and other attributes will be more apparent from the more detailed descriptions of the application below.

The polymers which are employed in combination with solid alkali metal to provide the remarkable electrical conductors produced by the process of this invention are, as indicated above, thermoplastic polymers and are characterized by inertness to alkali metal. They are further characterized by a tensile strength of at least 800 and preferably at least 2000 p.s.i., a flexural modulus of less than 200,000 and preferably less than 50,000 p.s.i., and by a degree of water permeability of less than 3.0 and preferably less than 0.5 gram per 24 hours per 100 square inches of film per mil thickness. In high voltage applications the polymers may be additionally characterized by a dielectric strength greater than 450 volts per mil, and preferably greater than 500 volts per mil, as well as a dissipation factor less than 0.001 at 60 cycles, and preferably less than 0.0003 at 60 cycles, and dielectric constant less than 3.0 and preferably less than 2.5.

While any of the thermoplastic polymers characterized by the above properties can be used in the process of this invention, the hydrocarbon polymers have been found to be outstanding and are therefore preferred. Particularly preferred are the hydrocarbon polymers of monoolefinic hydrocarbons containing from two to six carbon atoms inclusive. Such hydrocarbon polymers include both the hydrocarbon homopolymers and the copolymers and terpolymers of such hydrocarbon monomers.

Typical of such polymers and copolymers are the low, medium and high density polyethylene as well as polypropylene, polybutene and ethylene-hexene copolymers and the like. Such copolymers useful in this invention should contain more than 50 percent polymerized ethylene and propylene or butene. They can however contain amounts less than 50 percent of other copolymerized hydrocarbon such as pentene, hexene and the like. Of course mixtures of two or more of such polymers and copolymers in the form of blends can also be employed. Best results to date have been obtained with a polyethylene having the above-referred to properties and having a density of from about 0.91 to about 0.96. Most preferred copolymers are the ethylene copolymers such as ethylene-propylene copolymer and ethylene-neo-hexene copolymer.

It will be appreciated that the specific hydrocarbon polymers employed as the insulation for the composite electrical conductors can contain minor amounts of one or more additives to modify the properties thereof without materially detracting from the remarkable high voltage characteristics thereof. For example, minor amounts of polar polymeric materials such as the ethylene-vinyl acetate or ethylene-ethyl acrylate copolymers can be blended with the hydrocarbon polymers referred to above to provide specific improvements in low temperature flexibility, impact resistance, stress cracking resistance and the like. For the most part such materials are added in an amount of up to about 4% by weight of the hydrocarbon polymer, although amounts of such additives up to about 15% by weight of the hydrocarbon polymer can sometimes be employed with good results. According to our experience as the amounts of such additives progressively increase over and above about 15% by weight, they tend to proportionately detract from the desirable properties of our composite electrical conductor in high voltage applications. Other additives such as pigments, stabilizers, anti-oxidants and the like can also be incorporated by blending within the specific hydrocarbon polymers referred to above without adversely affecting the insulating properties thereof or the electrical characteristics of the conductor. These additives do not detract from the composite conductors in low voltage applications and their presence has little or no effect in the process of this invention. In general, these latter additives are incorporated in the hydrocarbon polymer in amounts consistent with their well-known usage in the conventional art. It should be noted, however, that such additives can not be used if they cause the polymeric composition to be reactive.

The alkali metals useful as electrical conductor metals in the conduct of the process of this invention are those having an atomic weight less than 40. Illustrative of such metals are lithium, sodium and potassium. Because of its ready availability, cost and properties, sodium is the preferred alkali metal for use in this invention. While such metals are known to be conductive in their fluid or molten state, the present invention is based in part on their use in a solid state.

In the event that a semi-conductive polymeric conductor shield is utilized it functions as part of the conductor element and is so considered here. Depending on environmental conditions involved, as well as on the particular application concerned, the composite electrical conductors prepared by this invention can readily be modified, if desired to adapt them to unusual environments or special service conditions. Thus, for example, barriers can be provided about the composite conductor to provide an added measure of resistance to oxygen and moisture permeation as well as a degree of added protection against physical damage to the hydrocarbon insulation. Similarly, electrical shields can be provided about the solid conductor core or about part of all of the composite electrical conductor depending upon whether the same is intended to serve as conductor or insulation shielding. The polymeric layers can be conveniently provided through the use of a multi-orifice die, wherein the layers or coverings are provided simultaneously.

Figure 3:
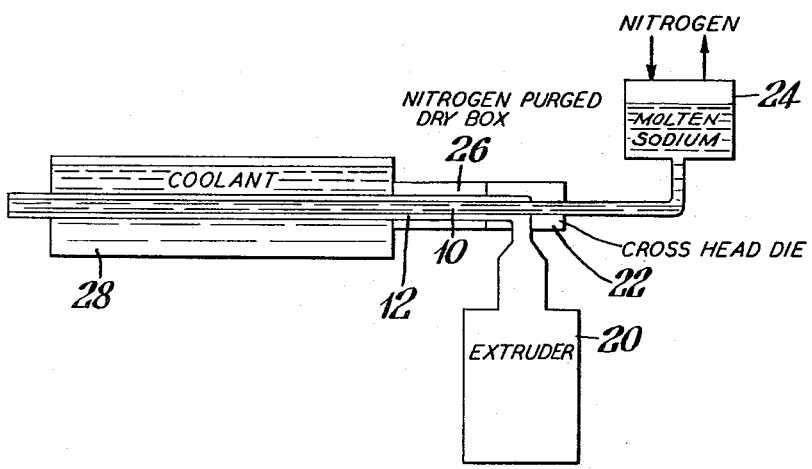
FIG. 3 is a schematic representation of the preferred process of this invention.

With particular reference to the drawings, the essential components of the composite electrical conductors are depicted in cross-sectional view in FIG. 1 and comprise a solid alkali metal core 10 encased in or surrounded by a flexible inert polymer of the hereinabove defined composition. Such conductors can be easily produced in accordance with the present invention in varying sizes having practically any core diameter and insulation thickness desired. The preferred embodiment of the process of this invention is schematically depicted in FIG. 3. Referring to said figure and with continued reference to polyethylene and sodium as merely illustrative of useful hydrocarbon polymers and alkali metals which can be employed, pressurized molten thermoplastic resin is fed from an extruder 20 through an annular orifice in a cross-head die 22, thereby forming extruded polyethylene tubing 12. Simultaneously with the extrusion of the tubing 12, pressurized molten sodium metal is fed from a feed tank 24 blanketed with an inert gas, through a circular central orifice in the cross-head die 22, thereby forming a molten sodium rod or wire 10 as it fills the extruded tubing 12 and solidifies on cooling. Since the thermoplastic resin and the sodium are extruded simultaneously both the resin and the sodium are in a molten state and in the absence of air when they are brought together and as the system is hydraulically filled, the effects of shrinkage of the metal from cooling are compensated for. This filling effect is believed to be the reason that the conductor core is void-free.

When a semi-conductive polymer conductor shield is employed in the conductor element, the bond between the semi-conductive polymer and the hydrocarbon polymer has been found to be essentially void-free. This is not necessarily true of the interface between the alkali metal and the semi-conductive polymer.

The dimensions of the composite conductor provided by the simultaneous extrusion process of FIG. 3 i.e., the diameter of the sodium rod or wire 10 and the thickness of the polyethylene insulation 12, can be controlled by adjusting a number of interdependent variables. For any given cross-head die, the main variables are the temperature and pressure of the molten resin, the temperature and pressure of the molten sodium, and the take-off speed or withdrawal rate of the composite conductor. In general, the diameter of the sodium wire 10 increases with increasing sodium pressures and with increasing sodium or resin temperatures. Similarly, the thickness of the insulation 12 decreases with any increase in the diameter of the sodium wire, and with increasing take-off speeds.

Thus it will be appreciated that, within limits, a wide variety of composite conductors can be made from a single extrusion die by merely modifying one or more process variables. The diameter of the composite conductor may also be controlled by the use of sizing plates. Thus, all dimensions of the composite conductor as extruded can be readily controlled by adjusting one or more of the aforementioned variables.

From the cross-head die 22, the extruded composite conductor is passed through a dry box 26 (which may be filled with an inert gas, such as nitrogen) which prevents the die from being cooled by the coolant in the adjacent cooling bath 28 and provides a measure of safety in the event that a break occurs in the insulation 12 upon extrusion thereof. The dry box can be provided with a transparent cover or window to permit observation of the extrusion operation.

From the dry box 26, the composite conductor is passed through a liquid cooling bath 28 to set the insulation 12 and solidify the sodium wire 10. The cooling liquid is preferably an oil or other liquid which is inert to both the sodium and the insulation, as a safety precaution in case a break occurs in the insulation 12. The temperature of the cooling bath can be adjusted to provide adequate cooling in accordance with the temperature of extrusion, the length of the bath, the size of the conductor, the take-off speed, and the like. Of course, the cooling tank 28 may be replaced by any other suitable cooling means, such as gas cooling or a cooling belt contoured to fit the conductor.

During start-up of the process illustrated in FIG. 3, the thermoplastic material from the extruder 20 is initially extruded without the molten sodium until the desired extrusion rate and other operating conditions have been established and stabilized. During this start-up period, the thermoplastic insulation may be allowed to collapse as it emerges from the annular die orifice, thus forming a solid or nearly solid rod, or it may be maintained in the form of a tubing by feeding a pressurized gas through the central orifice of the die. After the desired conditions have been established, the flow of the sodium 10 within the insulation 12 is started. It is important that the molten sodium be continuously encased within the die 22 and the insulation 12 during the extrusion operation, to achieve a firm bond between the conductor element and insulation.

A unique characteristic of the composite electrical conductors which can be produced by the process of this invention is the extent to which the alkali metal core element and the surrounding insulation polymer adhere to each other. For example, the sodium core of a composite electrical conductor prepared by the process depicted in FIG. 3 and described above, cannot be pulled from or through the surrounding polyethylene casing. In addition, it has been found that such composite conductors can be uniformly drawn to smaller sizes with a corresponding uniform reduction in the diameter of the sodium core and in the thickness of the surrounding polyethylene casing. Since the sodium core and polyethylene casing of the drawn conductor exhibit much of the unique adhering phenomenon described above, it would appear that the strength thereof at or about the sodium-polyethylene interface is as great as the strength of the polyethylene itself or of the solid sodium core. Stated differently, it would appear that a force sufficient to deform the polyethylene casing and solid sodium rod of our composite conductor is not sufficient to destroy the adhering relationship of the two at or about their interface. The nature and strength of this adhering relationship tends to indicate that the polyethylene casing is firmly bonded to the solid sodium core. As far as is known this adhering relationship is not characteristic of conventional composite conductors.

The reasons why the composite electrical conductors produced in accordance with the process of this invention are characterized by the unique adhering relationship between the alkali metal core and the hydrocarbon polymer casing are not fully known or completely understood. Visual examination of the cross-sectional specimen of our composite conductor and corona tests both show that the interface between the core and the casing is essentially free of voids, i.e., the outer surface of the core and the inner surface of the polymer casing are in intimate and apparently continuous contact.

Figure 1:
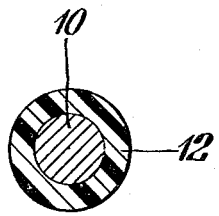
FIG. 1 represents a cross-sectional view of the simplest embodiment of a composite insulated electrical conductor which can be prepared in accordance with the process of this invention.
Figure 2:
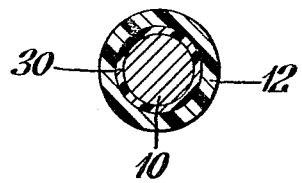
FIG. 2 represents a cross-sectional view of an embodiment of a composite insulated electrical conductor which can be prepared in accordance with the process of this invention in which a conductor shield is positioned between the alkali metal core and the hydrocarbon insulation.

The composite conductor illustrated in the cross-sectional view of FIG. 2 is somewhat similar to that depicted in FIG. 1 in that the alkali metal conductor 10 is surrounded by a semi-conductive polymeric conductor shield 30 which is in turn surrounded by thermoplastic polymer insulation 12.

The semi-conductive electrical conductor shield 30 employed in the embodiments of this invention illustrated in FIG. 2 of the drawing generally comprises a carbon black filled inert polymer, preferably a carbon black filled polymer such as ethylene-vinyl acetate copolymer, ethylene-ethyl acrylate copolymer and the like. When the semi-conductive polymer composition is a hydrocarbon polymer composition such as an olefin hydrocarbon polymer, the capacity of such composition to be filled with semi-conductive carbon black can be enhanced by the addition of such non-hydrocarbon polymers as vinyl acetate or ethyl acrylate polymer or copolymers thereof with one or more polymerizable hydrocarbons such as ethylene, propylene and the like in amounts by weight up to that of the hydrocarbon polymer itself.

The alkali metal conductor can, if desired, be immediately surrounded by a semi-conductive polymeric material as illustrated in FIG. 2. In such constructions the semi-conductive annular layer functions as part of the conducting element. When the semi-conducting conductor shield is used the insulation is applied directly to this shield and the same requirements of the insulation to conductor element apply as when the insulation is applied directly to the alkali metal conductor. However since the conductor shield functions as part of the conductor element the bond between the conductor and semi-conductive polymer need not be void free for high voltage applications.

The composite conductor of FIG. 2 can be easily produced by a modified form of the process depicted in FIG. 3 wherein a multi-orifice die is used. This modified form of the process represents another embodiment of this invention. In the modified process a concentric multi-channel die is provided which permits extrusion of the polymeric material and the polymeric insulation in concentric tubular form. The number of channels and corresponding concentric orifices provided in the die determines the number of concentric layers of material which can be formed in the tubular extrudate. The polymeric material fed to the respective channels and orifices determines the particular structure of the extrudate. For example in the composite structure of FIG. 2 a two channel die is used wherein the semi-conductive polymeric material 30 is extruded from the interior annulus of the die. The polymeric insulating material is extruded from the exterior annulus of the die. As in most other cases the molten alkali metal is supplied to the tube from a channel in the center of the die. The adhesion between the polyethylene insulation and semi-conductive polymeric material has been also found to be exceptionally high when prepared in this manner. All interfaces have been found to be free of voids by visual examination and corona tests.

Variations in the number of concentric layers of the composite conductors can be easily made by merely varying the number of channels and orifices of the die. The position of various polymeric materials in the structure of the composite conductor is determined by the particular orifice through which it is extruded. Thus, for example, to produce a conductor-shield/insulation-shielded composite electrical conductor of sodium surrounded by annular layers of semi-conductive thermoplastic polymer, polyethylene and finally semi-conductive thermoplastic polymer, a three channel die is used. Similarly an inner annular layer of inert thermoplastic can be provided through the inner annulus of the die and any other suitable thermoplastic material can be co-extruded through the outer annulus of the die. As long as the surface of the interior annulus is of an inert material the outer layers can be of materials reactive with sodium such as cross linkable, peroxide containing polyethylene compositions.

When a semi-conductive insulation shield is present in a composite electrical conductor, it is frequently necessary to strip portions of the shield layer from the insulating polymer. Such stripping is usually necessary when splicing cables or applying terminal connections. It has been found that when the semi-conductive thermoplastic ground shield is applied to the insulating polymer by simultaneous coaxial extrusion, the adhesion between the two layers is such that the semi-conductive layer can be removed only by cutting. We have found however, that if the ground-shield layer is applied after the insulation layer has been permitted to cool then sufficient adhesion is provided to hold the two layers together but it can be readily stripped from the insulation through the use of normal stripping procedures.

It is therefore another embodiment of this invention to provide for the controlled strippability of polymeric layers subsequent to the insulation by cooling said insulation prior to the application of said subsequent layers.

In the conduct of this invention the temperature at which the polymer is extruded is its melt flow temperature. This is the temperature at which thermoplastic polymers are normally extruded. For any given polymer the extrusion temperatures are well known in the art. For example in the use of polyethylene the extrusion temperature is from about 130° to about 300° C. and preferably from about 130° to about 250° C. The thermoplastic extruded tube is filled with molten alkali metal at a temperature of from about 1° C. to about 100° C. above its melting point, and preferably from about 5° C. to about 40° C. above its melting point. Thus for sodium such temperatures are from about 98.7° to about 200° C. and preferably from about 100° to about 175° C.

The pressure under which the molten alkali metal is fed to the interior of the tube as it is extruded is not narrowly critical and can vary over a wide range. Oftentimes the pressure employed will depend upon the relationship between the desired conductor core diameter and/or insulation thickness of the product and the corresponding dimensions of the same when extruded. For example, negative pressures can be employed when the extruded tube is of a larger diameter and/or thickness than that ultimately desired. In such situations, the molten tubing is drawn as it leaves the annular orifice of the extruder to its desired size and a negative pressure (vacuum) is created within the tube and about the molten metal orifice. Positive pressures can be employed in such situations as well as in situations where different relationships exist between the extruded and final dimensions of insulated conductor. According to our experience, when sodium is the intended conductor metal, pressures of from about −20 inches to about 60 inches, and preferably of from about −10 inches to about 30 inches of sodium can be employed with acceptable results.

The number of annular layers which can be provided by the process of this invention is limited only by the practical size of the die and the number of channels which can be provided therein. For most purposes however two or three channel dies are sufficient.

Metallic insulation shield or drain wires can be applied to the alkali metal composite conductors by conventional techniques in series or as a separate operation.

In the examples which follow and throughout this specification, unless otherwise indicated, properties are determined by the following tests and are measured in the indicated units:

Melt index:
    Measured in decigrams per
      min. _____ A.S.T.M. D-1238.
Tensile strength:
    Measured in pounds per sq.
      in. _____ A.S.T.M. D-412.
Flexural modulus:
    Measured in pounds per sq.
      in. _____ A.S.T.M. D-790.
Moisture permeability:
    Measured in grams per 24
      hrs. per 100 sq. in. of film
      per mil thickness _____ A.S.T.M. E-96-53T/
                                  Procedure E.

The following examples serve to illustrate this invention.

The resins employed in the examples and their properties were as follows:

| Resin Designation | DFD-6603 | DGD-4300 | EJE103. |
|---|---|---|---|
| Resin Type | Polyethylene | Polyethylene | Polypropylene. |
| Density | 0.920 | 0.950 | 0.902. |
| Melt index | 0.2 | 0.25 | 1.5. |
| Tensile strength | 2,400 | 3,400 | 4,900. |
| Flexural modulus | 43,000 | 160,000 | 165,000. |
| Moisture permeability | 1.4 | 0.3 | 0.6. |

These resins are referred to by designation for convenience.

Utilizing the method depicted in FIG. 3, polyethylene resin DFD-6603 was extruded through an annular orifice having an inside diameter of ¼ inch and an outside diameter of ½ inch. The resin was extruded at a low rate at a temperature of 130° C. (temperature in die). The molten sodium was fed into the extruded plastic tubing through a hollow pin in the cross-head die at a temperature of 112° C. From the extrusion die, the resulting polyethylene insulated sodium conductor was passed through a dry box, and then on through a cooling bath of highly reacted polypropylene glycol diether. The cooling bath was maintained at a temperature of 25° to 27° C.

The dimensions of the sodium wire and the polyethylene insulation were controlled by adjusting the take-off speed and the pressure of the molten sodium as shown in the following tables. In the table, "AWG" means American Wire Gauge. These composite conductors are as illustrated in FIG. 1 of the drawings.

TABLE I

| Sodium Diameter inches | Approximate Equivalent Copper Wire Size (AWG) | Polyethylene Thickness (inches) | Sodium Pressure (inches of liquid having specific gravity of 1.0) | Take-Off Speed/min. |
|---|---|---|---|---|
| .263 | | .054 | 17.1 | 6'2½" |
| .184 | #9 | .048 | 11.3 | 6'7½" |
| .167 | #10 | .032 | 14.6 | 11'4⅝" |
| .261 | #6 | .044 | 18.2 | 5'4¾" |
| .222 | #8 | .095 | 7.5 | 5'3" |
| .250* | #6 | .046 | 14.0 | 7'10" |
| .064 | #19 | .013 | 6.8 | 70' |

*DGD-4300 Polyethylene.

Samples of the above conductors were sliced longitudinally for examination of the internal structure. The sodium was found to have filled the polyethylene tube completely and uniformly with no voids whatever. Also the sodium and polyethylene were adhered to the extent that attempts to remove the polyethylene casing resulted in breaks in the sodium rather than at the sodium polyethylene interface.

In a similar manner to that described above a sodium conductor cable was made utilizing EJE–103 polypropylene resin as the insulation material. The composite conductor had the following specifications:

```
                                                Inches
Outside diameter _____ .088
Wall thickness _____ .018
Sodium conductor diameter _____ .052
```

The molten polypropylene resin was extruded at a low rate at a temperature of 206° C. The molten sodium was fed into the molten extruded thermoplastic tubing through a hollow pin in the cross head die at a temperature of 108° C. and a pressure of 9.8 inches of sodium. The take-off speed was 112 feet per minute. The apparatus and other conditions of the preparation were as set forth above. Similarly, samples of the polypropylene jacketed conductors were sliced longitudinally for examination of internal structure and were found to be completely and uniformly filled with sodium with no voids whatever. The adhesion of the sodium to the polypropylene was similar to that experienced with the polyethylene.

It will be appreciated that in a similar manner other inert thermoplastic polymeric materials can be used as insulation to the alkali metals conductors of this invention for example ethylene-vinyl acetate, copolymer, ethylene-ethyl acrylate copolymer, ethylene-neohexene copolymer and the like can be applied in place of polyethylene. Similarly lithium and potassium can be used in place of sodium.

A sample of polyethylene-insulated sodium conductor was tested for flexibility by measuring the load required to bend the center of a 2.5-inch unsupported section of a conductor a distance of 0.025 inch. The same tests were also conducted on empty polyethylene tubes identical to those filled with sodium, and on stranded copper conductors of various sizes.

The results of these tests are shown in Table II.

TABLE II

| Test Item | Insulation | | Equivalent AWG Wire Size* | Load in pounds |
|---|---|---|---|---|
| | Material | Thickness, mils | | |
| No. 4 Copper wire (7 strands .0772" dia.) | Flexible vinyl | 50 | | 10.8 |
| Sodium filled tube having a sodium diameter of 0.263 inch. | Low Density Polyethylene. | 52 | 4 | 2.0 |
| Empty tube (same as above) | ____do____ | 52 | 4 | 1.0 |

*Based on approximate equivalent AWG wire size.

As can be seen from the above data, the sodium-filled polyethylene tube was substantially as flexible as the same tube when empty. Moreover, the sodium-polyethylene conductors were considerably more flexible than the equivalent copper conductor insulated with a flexible vinyl compound. When the sodium was encased in a high density resin, the deformation load was 8.2 pounds vs. 8.0 pounds empty.

In another example of the invention, a low density polyethylene insulated sodium conductor having the structure exemplified and illustrated in FIG. 1 of the drawings was tested for low temperature flexibility. The insulated conductor had the following dimensions:

```
Outside diameter _____ 0.367
Conductor diameter _____ 0.263
Wall thickness _____ 0.052
```

The polyethylene used was DFD–6603.

In this test the composite conductor was held at a temperature of −40° C. for a period of three hours and then flexed through 180° ten times in the alternating directions. No cracking appeared in either the sodium or the insulation.

In further examples, sodium-filled polyethylene (density of 0.9334) tubes having a wall thickness of 0.036 inch, an inside diameter of 0.312 inch and an outside diameter of 0.384 inch were measured for electrical resistance and then immersed in water. The resistances of the conductors were unchanged after two years of continuous immersion.

A sodium-filled polyethylene tube was prepared and tested for A-C and D-C resistance. The A-C resistance at 60 cycles/sec. was found to be the same as the D-C resistance. The composite conductor was then surrounded by an iron pipe, and the A-C resistance was found to increase by a factor of at least five.

In another test, which demonstrates the safety aspects of the cables produced by the present process, holes of varying size up to 0.15-inch diameter were drilled through the wall of a polyethylene insulated sodium conductor, partly penetrating the sodium. The punctured portion of the conductor was then vertically immersed in water. When the holes were cleaned and scraped with a wire while under water, hydrogen evolution took place from the larger holes. However, even with the largest hole, the reaction gradually subsided after the wire was removed. Subsequent cutting of the conductor revealed a layer of oxide or hydroxide over the exposed sodium, which prevented further reaction. Of course, the punctured conductors fail electrically, but the test was significant from a safety standpoint in that the reaction was limited to the exposed area and was self-terminating.

To illustrate another variation of the composite conductors produced by the process of this invention wherein a composite conductor feed stock of relatively large diameter (or cross-section) prepared by the present process was reduced to smaller diameter the following examples and data are cited.

An extruded conductor comprising a sodium conductor 0.108 inch in diameter insulated with polyethylene DGD–4300 was produced by the method illustrated in FIG. 3. The outside diameter ("O.D.") of the composite conductor was originally 0.179 inch, and the wall thickness of the insulation was 0.035 inch.

About 500 feet of this conductor was passed in turn through a series of dies on a conventional wire drawing machine at a speed of about 400 to 600 feet per minute, the dies being graduated so as to achieve about a 20% reduction in cross sectional area in each pass. After passing through each die the conductor was measured and its tensile strength determined in conventional manner. In these tests it was observed that the diameter of the sample increased somewhat or recovered between the time it first passed through a die and the time its tensile strength was determined. In Table III the results of these tests are presented showing die sizes, outside diameter (O.D.) of the conductor at the time of tensile test, ultimate tensile strength in pounds per square inch (p.s.i.) and percentage elongation with respect to the original length.

TABLE III

| Sample No. | Die Diameter (inch) | Insulating cross section in square inches | O.D. (inch) | Tensile Strength, p.s.i. | Elongation, percent |
| --- | --- | --- | --- | --- | --- |
| Original | None | .0160 | 0.179 | 2,550 | None |
| A | 0.153 | .0133 | .0.1625 | 3,060 | 21 |
| B | 0.1369 | .0125 | 0.1575 | 3,200 | 29 |
| C | 0.1222 | .0102 | 0.142 | 4,130 | 59 |
| D | 0.1091 | .00644 | 0.133 | 6,580 | 151 |
| E | 0.0974 | .00525 | 0.102 | 9,089 | 208 |

It will be noted from the data in Table III that the strength of the conductor was improved nearly four-fold while it was elongated to three times its original length and its diameter was reduced to about 40 percent of original.

In another example another length of the feed-stock composite conductor described above and produced by the process of this invention was passed through the same dies used in the previous examples arranged in series, the conductor being fed through one die into the next at an overall speed of about 78 feet per minute. The outside diameter of the conductor (sample F) was reduced from 0.179 inch to 0.1015 inch and its tensile strength was raised from 2550 p.s.i. to 9750 p.s.i. while it elongated 211 percent.

In a third example another sample of feed-stock composite conductor of the type used in the two previous examples was passed through the same dies in series at a speed of about 345 to 366 feet per minute. It was observed that at these speeds the conductor is appreciably warmed by friction and that some stretching of the conductor occurred after it left the last die. The diameter of the sample (sample G) after reduction was 0.0635 inch; it elongated 695 percent as compared to the original, and its tensile strength was raised from 2550 p.s.i. to 41,000 p.s.i., indicating that substantial orientation of the insulation had taken place.

In another example a feed-stock composite conductor of the same structure and composition set forth in the above three examples and having a sodium conductor diameter of .082 inch, a polyethylene insulation thickness of 0.044 inch and an outside diameter of 0.170 inch was passed through the same series of dies at a speed of 354 to 385 feet per minute. Again frictional heating occurred. The outside diameter of the conductor (sample H) was reduced to 0.0665 inch; its tensile strength increased from 2520 p.s.i. to 28,700 p.s.i. and it elongated 552 percent.

In a fifth example a feed-stock composite conductor of sodium having a conductor diameter of 0.033 inch, insulated with low density polyethylene having a wall thickness of 0.017 inch was used. The polyethylene insulation was DFD–6603.

The feed-stock was passed through individual dies at 690 feet per minute. The test results are set forth in Table IV below:

TABLE IV

| Sample | Die Diameter (inch) | Insulating cross section in square inches | O.D. (inch) | Tensile Strength, p.s.i. | Elongation, percent |
| --- | --- | --- | --- | --- | --- |
| Original | None | .00276 | 0.067 | 3,500 | None |
| J | 0.054 | .00221 | 0.060 | 4,060 | 25 |
| K | 0.050 | .00196 | 0.0565 | 4,600 | 40 |

Additional tests on samples G and H have shown that the tensile modulus was raised from 66,200 p.s.i. to 238,000 p.s.i. in the case of sample G and from 86,000 to 191,000 p.s.i. in the case of sample H. Moreover the breaking strength of these conductors after elongation was substantially greater than that of bare and conventionally insulated copper wires of comparable size as shown in Table V.

TABLE V

| Sample | Wire Diameter (inch) | O.D. (inch) | Break Strength pounds, |
| --- | --- | --- | --- |
| #18 Copper Bare | 0.041 | 0.041 | 49 |
| Sample G (from above) polyethylene insulated sodium | 0.041 | 0.067 | 83.9 |
| #20 Copper Bare | 0.031 | 0.031 | 29 |
| #20 Copper Insulated | 0.031 | 0.094 | 39.7 |
| Sample H | 0.032 | 0.066 | 72.5 |

It will be observed from the above data that this method whereby the cross-section of the insulated conductor feed stock is reduced not only provides a commercially attractive way of producing composite sodium conductor of small diameter but also makes possible the production of such conductors that are significantly stronger than comparable copper conductors. Indeed, in conductors so produced the insulation may be the tensile or load-carrying member in contrast to conventional insulated copper or aluminum conductors wherein the metal is the tensile member.

Experiments were conducted to determine the corona extinction voltage of polyethylene insulated sodium conductor produced in accordance with the process of this invention and to also determine the effect bending the cable has on the corona extinction voltage.

A thirty-foot length of cable having the following specifications was evaluated:

Cable 1:
Cable rating _____ 15 kv.
Sodium conductor _____ 0.500 inch in diameter.
Semi-conductor strand shield __ Extruded polyethylene containing carbon black .030 inch.
Polyethylene insulation _____ 0.220 inch wall thickness.
Return conductor _____ Semi-conducting paint, tinned copper mesh braid, insulated with polyethylene tape.

The polyethylene resin used as the insulation was DFD–6603.

This cable was fitted with a premolded stress cone at each end. The corona level was determined by increasing the voltage until corona occurred, and then decreasing the voltage until the last trace of corona vanished and recording that voltage as the extinction voltage.

After this determination had been made the cable was wrapped its full length around a drum of approximately twenty-four inches in diameter. The cable was then uncoiled from the drum and rewound with the opposite side of the cable adjacent to the drum. Two additional bends were made in the same manner. The total bending on the cable was two complete "bends" in each direction. The corona extinction voltage was then remeasured.

A forty-foot sodium conductor insulated with polyethylene and utilizing no semi-conductor strand shield was evaluated in a similar manner except that the cable was wrapped about a 15-inch diameter drum instead of a twenty-four inch diameter drum.

This cable had the following specifications:

Cable 2:
Cable rating _____ 15 kv.
Sodium conductor _____ 0.500 inch diameter.
Polyethylene insulation ____ 0.220 inch wall thickness.
Return conductor _____ Approximately 30 mils of semi-conductive polyethylene/carbon black and copper mesh wrapped with polyethylene tape.

The polyethylene resin used as the insulation was DFD–6603.

The results of these evaluations were as follows:

| | Original Corona Extinction Voltage, kv. | After Bending Corona Extinction Voltage, kv. |
|---|---|---|
| Cable 1: Sodium conductor cable with semi-conductive polyethylene in contact with sodium conductor as strand shield-illustrated in Fig. 2 of the drawings | 20 | 20 |
| Cable 2: Sodium conductor cable with polyethylene insulation in contact with conductor metal—no semi-conducting strand shield—illustrated in Fig. 1 of the drawings | 28 | 26 |

The standards established by the Insulated Power Cable Engineering Association require the use of semi-conducting strand shielding for high voltage aluminum and copper conductor cables and specify a minimum corona extinction level of 9.5 kv. for a 15 kv. design capacity cable. In view of the forgoing results this requirement would clearly not be essential with the composite conductor of this invention.

Additionally by way of comparison a copper conductor having an effective nylon semi-conductive strand shielding and insulated with polyethylene designed for 15 kv. exhibits a corona extinction voltage of about 14.5 kilovolts. A similar copper conductor provided with an ineffective semi-conductive strand shield, i.e., essentially without strand shielding identically insulated with polyethylene exhibited a corona extinction voltage of from about 4.5 to 5.0 kilovolts.

A comparison of the results of the experiment clearly indicate that the cable constructions produced by the process of this invention do not require semi-conductive strand shielding as do copper and aluminum although this shielding can if desired be used. It is also apparent that the subject cable constructions are clearly in excess of the minimum industry standards with or without strand shielding, for the designed capacity of the composite conductor.

To further evaluated insulating materials a commercial cable coating composition of polyvinyl chloride plasticized with dioctyl phthalate was used to insulate a sodium conductor cable in direct contact with the alkali metal. In this experiment the plasticized polyvinyl chloride insulation was coextruded around the molten sodium conductor as described in this specification. The insulation and metal presented a molten interface. This cable was extruded directly into a dry box and was then passed into a cooling trough filled with circulating oil. At the end of the trough the cable was wiped dry and wound on a spool. The sodium conductor had an average diameter of 450 mils with an average insulation wall thickness of about 200 mils making a total diameter of 850 mils.

It was noted that immediately on contact with the polyvinyl chloride the sodium conductor metal turned bright red. After cooling the sodium metal became gold in color and appeared mottled and pitted. The interface between the metal and insulation was very poor. The metal conductor was characterized by cracks and crevices in the surface. It is quite obvious that these defects make this insulation unsuitable for commercial use as an alkali metal electrical conductor insulation.

In order to determine the vulnerability of the sodium conductor cables insulated with a hydrocarbon polymer to fire, two fifteen inch lengths of cable were prepared. This cable, prepared by the present process, had a sodium conductor diameter of about 0.500 inch and a low density polyethylene insulation (0.92) having a wall thickness of about 0.220 inch. One length was placed in a horizontal position and a gas torch was applied to one end. The polyethylene took fire and remained burning while the torch was applied to the end but extinguished shortly after removal of the torch. The sodium metal did not take fire but formed an oxide and carbonate crust which protected the conductor metal from further reaction or dripping of molten metal.

The second fifteen inch length of polyethylene insulated cable was supported in a vertical position and the lower end was ignited with a gas torch. Again a crust of oxide and carbonate formed over the conductor protecting it from further reaction or dripping. When the flame was removed, the polyethylene insulation extinguished itself after a short time.

Considering the low melting point of sodium metal it is believed quite surprising that the conductor metal did not flow from the insulation but rather sealed itself off by the formation of an oxide and carbonate crust.

In this experiment a standard No. 4 AWG 7 strand copper cable was compared with cable prepared by the process of this invention having 0.250 inch diameter sodium conductor both insulated with 0.075 inch of DFD–6603 polyethylene under controlled stretch. The polyethylene resin used as the insulation of both cables was DFD–6603.

In this test 47.5 feet of the copper cable and 46.5 feet of sodium conductor cable were suspended between two buildings. Each cable in its turn was pulled downward by a fork lift truck through an anchored pulley.

After a vertical displacement of 12 feet or 12% the copper cable broke. After an elongation of approximately 30 percent or vertical displacement of 19.25 feet the sodium conductor cable was released and immediately recovered to six feet elongation and after a short recovery period this cable had recovered all but one foot, 11 inches or approximately 4.2 percent.

The test was repeated and the copper cable was carefully stretched to a displacement of 13 vertical feet (approximately 15 percent elongation) but upon release no recovery was noted. The sodium conductor cable was stretched to approximately 20 percent elongation and recovered immediately to 5 feet vertical displacement; and after 20 minutes to 3 feet vertical displacement. This cable was then again stretched to approximately 30 percent elongation and upon release immediately recovered to 7 feet vertical displacement and to five feet in ten minutes.

It is believed that the ability of the sodium conductor cable insulated with low density polyethylene to be stretched a reasonable amount and to recover to its approximate original length is an extremely valuable attribute to a commercially useable cable and that this attribute is both unexpected and surprising.

A conduit test was conducted to evaluate the handling qualities of sodium conductor electrical cable insulated with polyethylene in comparison with copper conductor electrical cable insulated with plasticized polyvinyl chloride.

In this evaluation a 100 foot 2.5 inch conduit was assembled in the shape of a square having five twenty-foot sides and utilizing four standard elbows of 90°. The elbow radius was 10.5 inches and total elbow length was 18.6 inches. The total conduit pull including elbows was 106 feet.

The electrical cables evaluated had the following specifications.

| Inner Conductor | Sodium | #1 AWG-19 Strand Copper | #2/0 AWG-19 Strand Copper |
| --- | --- | --- | --- |
| Diameter, inch | 0.500 | 0.333 | 0.432 |
| Insulation | [1] 0.050 | [2] 5/64 | [2] 5/64 |
| Approximate outside cable diameter, inch | 0.600 | 0.500 | 0.590 |
| Approximate weight in pounds/foot | 0.117 | 0.345 | 0.528 |
| Calculated maximum tension, pounds | 45 | 118 | 207 |
| Conduit fill factor, percent | 19.5 | 12.3 | 18.8 |

[1] Polyethylene resin DFD-6603.
[2] Polyvinyl chloride.

In this test three lengths each of the test cables were held at the end by a Kellems grip. The three cables were then pulled into the conduit by means of a winch. The tension was measured by a spring balance scale attached between the winch cable and the Kellems grip. A No. 12 BWG (British Wire Gauge) steel wire was used to pull the cable through the conduit run. The cable was pulled at a rate of one inch in 5 seconds while taking tension reading otherwise at a higher rate.

The polyethylene insulated sodium cable was drawn through the conduit under 65 pounds tension the #1 size copper conductor jacketed with plasticized polyvinyl chloride was drawn through the conduit under a tension of 380 pounds; and the 2/0 copper conductor jacketed with plasticized polyvinyl chloride required 560 pounds tension.

In this test the #2/0 copper cable jammed approximately four feet from the end of the conduit and would not move under 1100 pounds tension. The #1 copper cable required a tension of 450 pounds while the end was being drawn through the fourth 90° bend but only 380 pounds after passing through the bend.

It is believed that the facility of the low density polyethylene insulated sodium conductor cable to be drawn through a conduit under relatively low tension is a highly useful and unexpected attribute.

An evaluation was made on the sodium conductor cable insulated with the same low density polyethylene described in the preceding example to determine how it reacted electrically under stretch conditions. In this test a 20 foot length of sodium conductor polyethylene insulated sodium cable was fitted with Kellems grips spaced approximately 100 inches at the center of the sample. The ends of the cable were provided with a suitable copper contact for resistance measurements. The 100 inch center section was divided into five 20 inch sections by inked markings. The specimen was stretched between two posts by anchoring one of the Kellems grips to a post and by applying tension to the other grip by means of a winch secured to the other post. The electrical resistance of the conductor was measured at each step. The length of each of the 20 inch sections and the diameter of each section were measured for each 5 pound increase in tension. After reaching the limit of the 100 pound scale the tension was removed and measurements again made of the resistance and length. Resistance and length measurements were also made after approximately one hour and again after twenty hours. After approximately two weeks the resistance and length were again measured, the sample elongated further and resistance measurements made at each step. After approximately 50% elongation of the specimen the tension was again released and measurements again made immediately, after approximately one hour, and after approximately one day.

The results from this evaluation indicated that as the cable was elongated its electrical resistance increased and its outside diameter decreased. After a moderate elongation of 14.3 percent, the resistance increased 23 percent and the diameter decreased 6.7 percent. The cable length recovered immediately to 3.3 percent elongation and the resistance was 5 percent above the original. One and one-half hours after the tension had been released the cable length had recovered all but 1.7 percent in length and all but 0.2 percent in resistance. Length and resistance measurements made approximately two weeks after tension release indicated the specimen had recovered completely.

At a severe elongation of 49.2 percent the resistance increased 95 percent and the diameter decreased 18.5 percent. Upon release of tension the cable length and resistance recovered to 22.7 percent and 43 percent respectively above the original values. After about one hour the elongation was 16.8 percent and the resistance 27 percent above the original. After 20 hours recovery the elongation was 6.3 percent and the resistance was 11.4 percent higher than the original.

It is believed that the ability of the low density polyethylene insulated sodium conductor cable as produced by the present process to recover after stretch, both physically and electrically is an exceedingly valuable attribute for a commercial electrical cable and that further this property is unexpected as standard copper and aluminum conductor cables are not known to exhibit this recovery phenomenon.

It will be appreciated that the polymeric compositions discussed above such as the hydrocarbon polymers, normally contain various stabilizers such as heat and ultraviolet stabilizers, anti-oxidants and the like, to provide protection to these polymers and polymeric compositions. These additives are used in very minor amounts and are used in the compositions discussed and exemplified herein which are normal commercial polymers and polymeric compositions.

Such additives preferably have little or no effect upon the electrical or physical properties of the polymer and should have little or no activity with the sodium conductor metal in said polymeric compositions. To the extent they do not, they can be used.

While various specific embodiments of the invention have been illustrated and described in some detail, it will be understood that the same are susceptible of numerous modifications within the scope of the invention. For example, although the invention has been described with particular reference to solid sodium conductors, it will be apparent that the conducting member may have an annual cross-section. Moreover, additional layers of various materials may be added either inside or outside the composite conductor.

What is claimed is:

1. A process for the production of a composite electrical conductor comprising extruding as a tube, a molten thermoplastic polymer substantially inert to alkali metal, at least an annular portion of which is an electrical insulation and simultaneously filling said extruded molten thermoplastic tube in the absence of air with a molten alkali metal having an atomic weight of less than 40 while both said alkali metal and said thermoplastic polymer are in contact in a molten state and said alkali metal is under a pressure between —20 and +60 inches of sodium to maintain the filled tube in substantially the same shape as the extruded tube.

2. The process of claim 1 wherein the inert thermoplastic polymer is an inert polymer of an olefin having from 2 to 6 carbon atoms inclusive, said polymer being further characterized by a tensile strength greater than 800 p.s.i., a flexural modulus less than 200,000 p.s.i. and a moisture permeability of less than 3 grams per 24 hours per 100 square inches of film per mil thickness.

3. The process of claim 2 wherein the inert thermoplastic polymer is an ethylene polymer.

4. The process of claim 2 wherein the inert thermoplastic polymer is ethylene homopolymer and the alkali metal is sodium.

5. A process for the production of a composite electrical conductor comprising an alkali metal electrical conductor surrounded continuously and in contact with a flexible electrical semi-conducting thermoplastic polymeric composition substantially inert to said alkali metal in which said conductor and surrounding semi-conducting composition is continuously surrounded by a flexible thermoplastic polymer electrical insulation which comprises simultaneously extruding at least two concentric tubes in contact, the inner tube being a molten thermoplastic electrical semi-conducting polymeric composition and outer tube being a molten thermoplastic polymer of an olefin having from 2 to 6 carbon atoms inclusive, such that said concentric tubes form a single composite tube in the absence of air and simultaneously filling said inner tube with a molten alkali metal having an atomic weight less than 40 while both said alkali metal and said thermoplastic polymer are in contact in a molten state and said alkali metal is under a pressure between —20 and +60 inches of sodium to maintain said inner tube in substantially the same shape as the extruded tube, and cooling said filled composite tube.

6. The process of claim 5 wherein the alkali metal is sodium.

7. The process of claim 6 wherein the flexible thermoplastic polymer electrical insulation is an ethylene polymer and the thermoplastic electrical semi-conducting polymeric composition is an ethylene polymeric composition.

8. A process for the production of a composite electrical conductor which comprises simultaneously extruding a tube comprising an inner surface of a molten thermoplastic polymer being normally flexible and inert to alkali metals and at least one outer surface of molten electrically semi-conducting thermoplastic polymeric composition concentric with said inert thermoplastic polymer tube and in contact therewith such as to form a single composite tube, said electrically semi-conducting thermoplastic polymeric composition being normally flexible and while said inner surface is still at about its melt extrusion temperature, simultaneously filling said tube in the absence of air with a molten alkali metal electrical conductor having an atomic weight less than 40 while both said alkali metal and said thermoplastic polymer are in contact in a molten state and said alkali metal is under a pressure between —20 and +60 inches of sodium to maintain said inner tube in substantially the same shape as the extruded tube and cooling said filled tube.

9. The process of claim 8 wherein the semi-conducting thermoplastic copolymer is an ethylene polymer loaded with conductive carbon black and said inert thermoplastic polymer is an ethylene homo-polymer.

10. A process for the production of a composite electrical conductor which comprises extruding a tube of a molten thermoplastic polymer which is essentially inert to alkali metal, simultaneously filling said molten tube in the absence of air with a molten alkali metal, while both said alkali metal and said thermoplastic polymer are in contact in a molten state and said alkali metal is under a pressure between —20 and +60 inches of sodium to maintain the molten polyethylene tube in substantially the same shape as the extruded tube, allowing said filled molten tube to cool and thereafter applying a continuous coating of a molten thermoplastic polymer composition over the thermoplastic tube wherein the extent of cooling of alkali metal filled thermoplastic polymer tube determines the degree of adhesion of the outer polymeric coating.

11. The process of claim 10 wherein the outer polymeric composition is an ethylene-vinyl acetate or ethylene-ethyl acrylate copolymer composition loaded with conductive carbon black.

12. The process of claim 11 wherein the inner thermoplastic polymer is polyethylene and the alkali metal is sodium.

13. A process for the production of a composite electrical conductor which comprises continuously extruding a tube of molten polyethylene resin at a temperature of from about 130° C. to about 300° C. and simultaneously filling said molten polyethylene tube in the absence of air with molten sodium having a temperature of from about 98.7° C. to about 200° C. and while both said alkali metal and said thermoplastic polymer are in contact in a molten state and said alkali metal is under a pressure between —20 and +60 inches of sodium to maintain the molten polyethylene tube is substantially the same shape as the extruded tube, allowing said sodium filled polyethylene tube to cool.

14. A process for the production of a composite electrical conductor which comprises continuously extruding a tube of molten polyethylene resin at a temperature of from about 130° C. to about 250° C. and simultaneously filling said molten polyethylene tube in the absence of air with molten sodium having a temperature of from about 100° C to about 175° C. and while both said alkali metal and said thermoplastic polymer are in contact in a molten state and said alkali metal is under a uniform pressure between —20 and +60 inches of sodium to maintain the molten polyethylene tube in substantially the same shape as the extruded tube, applying a continuous concentric annular layer of another thermoplatic polymer about the molten polyethylene tube and allowing said sodium filled polyethylene tube to cool.

15. The process for the production of a composite electrical conductor comprising continuously extruding a melt of a normally solid thermoplastic polymer of a monoolefinic hydrocarbon containing from two to six carbon atoms, inclusive, at its melt flow temperature in the form of a tube, while simultaneously filling said tube in the absence of air with molten sodium at a pressure between —20 and +60 inches of sodium sufficient to completely fill said tube and while both the thermoplastic polymer and the sodium are in contact in the molten state, drawing the resulting filled thermoplastic polymer tube through a zone of an inert gas and thereafter cooling said filled thermoplastic tube in cooling means comprising a fluid inert to both sodium and the thermoplostic polymer for a time sufficient to solidify the sodium in said thermoplastic polymer tube.

16. The process of claim 15 wherein the pressure of the sodium is from about —10 inches to about +30 inches of sodium.

17. The process of claim 16 wherein the cooling fluid is an inert liquid.

18. A process for the production of a composite electrical conductor which comprises extruding a tube of a molten thermoplastic polymer of an olefin having from 2 to 6 inclusive carbon atoms which is essentially inert to alkali metal, simultaneously filling said molten tube in the absence of air with a molten alkali metal and while both said alkali metal and said thermoplastic polymer are in contact in a molten state and said alkali metal is under a pressure between −20 and +60 inches of sodium to maintain the molten thermoplastic tube in substantially the same shape as the extruded tube, applying a continuous concentric outer layer of a thermoplastic polymer about the molten thermoplastic tube to form a unitary structure and cooling the alkali metal filled tube.

19. The process of claim 18 wherein the outer layer is a material reactive with sodium.

20. The process of claim 18 wherein the outer layer is a semi-conductive thermoplastic polymer composition.

21. The process of claim 20 wherein the semi-conductive polymeric composition is an ethylene-vinyl acetate copolymer or ethylene-ethyl acrylate copolymer filled with conductive carbon black, the alkali metal is sodium and the inner thermoplastic polymer is polyethylene.

22. The process of claim 10 wherein the outer layer is a material reactive with sodium.

References Cited
UNITED STATES PATENTS

| | | | |
|---|---|---|---|
| 3,003,223 | 10/1961 | Breen | 264—171 X |
| 3,121,255 | 2/1964 | Henning et al. | 18—13 |

FOREIGN PATENTS

| | | |
|---|---|---|
| 655,342 | 1929 | France. |
| 973,315 | 1951 | France. |

OTHER REFERENCES

Koning, The Cooling of Electric Machines and Cables. Holland, 1957, pp. 214, 217, 229. Copy in Group 270 Sodium Digest.

ROBERT F. WHITE, *Primary Examiner.*

S. I. LANDSMAN, *Assistant Examiner.*